United States Patent
Jeong et al.

(10) Patent No.: US 9,482,914 B2
(45) Date of Patent: Nov. 1, 2016

(54) LIQUID CRYSTAL DISPLAY AND DISPLAY APPARATUS SET HAVING THE SAME

(75) Inventors: Seung-Chul Jeong, Seoul (KR); Han-Jin Ryu, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/179,274

(22) Filed: Jul. 8, 2011

(65) Prior Publication Data

US 2012/0008062 A1    Jan. 12, 2012

(30) Foreign Application Priority Data

Jul. 9, 2010 (KR) .................. 10-2010-0066317

(51) Int. Cl.
G02F 1/1333    (2006.01)
G02F 1/1345    (2006.01)
G02F 1/1335    (2006.01)

(52) U.S. Cl.
CPC ..... *G02F 1/13452* (2013.01); *G02F 1/133615* (2013.01); *G02F 1/1333* (2013.01)

(58) Field of Classification Search
None
See application file for complete search history.

(56) References Cited

U.S. PATENT DOCUMENTS

| | | | |
|---|---|---|---|
| 5,375,005 A | | 12/1994 | Komano |
| 5,489,999 A | * | 2/1996 | Matsumoto ..................... 349/62 |
| 5,694,190 A | * | 12/1997 | Matsumoto et al. ......... 349/151 |
| 5,986,726 A | * | 11/1999 | Murai .............................. 349/59 |
| 6,061,246 A | * | 5/2000 | Oh et al. ....................... 361/749 |
| 6,533,428 B1 | * | 3/2003 | Ogo et al. ..................... 362/631 |
| 2004/0189891 A1 | * | 9/2004 | Hayashimoto et al. ........ 349/58 |
| 2006/0119760 A1 | * | 6/2006 | Okuda ............................. 349/58 |
| 2006/0268194 A1 | * | 11/2006 | Morimoto et al. ............. 349/65 |
| 2007/0132907 A1 | * | 6/2007 | Kim ................................ 349/58 |
| 2007/0146295 A1 | * | 6/2007 | Yu et al. ....................... 345/102 |
| 2010/0149445 A1 | * | 6/2010 | Lee et al. ........................ 349/38 |
| 2010/0165235 A1 | | 7/2010 | Lee et al. |

FOREIGN PATENT DOCUMENTS

| | | |
|---|---|---|
| CN | 1782790 | 6/2006 |
| CN | 10177095 | 7/2010 |
| JP | 03-132065 | 6/1991 |
| JP | 05-224202 | 9/1993 |
| JP | 09-138388 | 5/1997 |
| JP | 10-206847 | 8/1998 |
| JP | 11-305205 | 11/1999 |
| JP | 2008-096950 | 4/2008 |

(Continued)

OTHER PUBLICATIONS

European Search Report corresponding to EP11173022.2, Nov. 16, 2011, 5 pages.

*Primary Examiner* — Uyen Chau N Le
*Assistant Examiner* — Chris Chu
(74) *Attorney, Agent, or Firm* — Innovation Counsel LLP

(57) ABSTRACT

Provided are a slimmer liquid crystal display (LCD) and a display apparatus set having the same. The LCD includes: a liquid crystal panel having sides; a light guide plate (LGP) which is overlapped by the liquid crystal panel; a container accommodating the LGP; a printed circuit board (PCB) which is disposed between the LGP and a sidewall of the container along one of the sides of the liquid crystal panel, and which is configured to provide an image signal to the liquid crystal panel; and a light source which is disposed between the LGP and a sidewall of the container along another one of the sides of the liquid crystal panel, and which is configured to provide light to the liquid crystal panel.

15 Claims, 21 Drawing Sheets

(56) References Cited

FOREIGN PATENT DOCUMENTS

| | | |
|---|---|---|
| JP | 2008-165232 | 7/2008 |
| JP | 2010-107985 | 5/2010 |
| JP | 2010-128498 | 6/2010 |
| JP | 2010-191432 | 9/2010 |
| KR | 10-2008-0006690 | 7/2006 |
| KR | 10-2008-0013311 | 2/2008 |
| KR | 10-2008-0022273 | 3/2008 |
| KR | 10-2008-0067047 | 7/2008 |
| KR | 10-2008-0084346 | 9/2008 |
| KR | 10-2009-0008581 | 1/2009 |
| KR | 10-2009-0090031 | 8/2009 |
| KR | 1020100048472 A | 5/2010 |
| TW | 200632823 | 9/2006 |
| TW | M373500 | 2/2010 |

\* cited by examiner

LIQUID CRYSTAL DISPLAY AND DISPLAY APPARATUS SET HAVING THE SAME

This application claims priority from Korean Patent Application No. 10-2010-0066317 filed on Jul. 9, 2010 in the Korean Intellectual Property Office, the disclosure of which is incorporated herein by reference in its entirety.

BACKGROUND OF THE INVENTION

1. Field of the Invention

The present invention relates generally to liquid crystal displays (LCDs). More specifically, the present invention relates to lower-profile LCDs.

2. Description of the Related Art

Liquid crystal displays (LCDs) are one of the most widely used types of flat panel displays (FPDs). Generally, an LCD includes two substrates having electrodes, with a liquid crystal layer interposed between the substrates. In an LCD, voltages are applied to the electrodes to rearrange liquid crystal molecules of the liquid crystal layer, thereby controlling the amount of light that passes through the liquid crystal layer.

In a conventional LCD, a printed circuit board (PCB) is typically exposed from a container that accommodates a backlight assembly and other elements. The PCB, being exposed from the container, increases the thickness of the LCD and is detrimental to its performance. Furthermore, the exposed PCB is more likely to be damaged by external impact.

SUMMARY OF THE INVENTION

Aspects of the present invention provide a slimmer liquid crystal display (LCD).

Aspects of the present invention also provide a display apparatus set having the LCD.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an LCD including: a liquid crystal panel having sides; a light guide plate (LGP) which is overlapped by the liquid crystal panel; a container accommodating the LGP; a printed circuit board (PCB) which is disposed between the LGP and a sidewall of the container along one of the sides of the liquid crystal panel, and which is configured to provide an image signal to the liquid crystal panel; and a light source which is disposed between the LGP and a sidewall of the container along another one of the sides of the liquid crystal panel, and which is configured to provide light to the liquid crystal panel.

According to another aspect of the present invention, there is provided an LCD including: a liquid crystal panel which has short sides and long sides; a driver IC chip which is mounted on the liquid crystal panel and includes an embedded timing controller; a PCB which is disposed along one of the sides of the liquid crystal panel, and is electrically connected to the driver IC chip; and a light source which is disposed along another one of the sides of the liquid crystal panel, and which is configured to provide light to the liquid crystal panel.

According to another aspect of the present invention, there is provided a display apparatus set including: an LCD; a front case which is placed in front of the LCD and has an open window exposing a display area of the LCD; and a back case which is placed behind the LCD and is coupled to the front case. The LCD can comprise any LCD consistent with the invention. For example, the LCD can comprise a liquid crystal panel having sides; a light guide plate (LGP) which is overlapped by the liquid crystal panel; a container accommodating the LGP; a printed circuit board (PCB) which is disposed between the LGP and a sidewall of the container along one of the sides of the liquid crystal panel, and which is configured to provide an image signal to the liquid crystal panel; and a light source which is disposed between the LGP and a sidewall of the container along another one of the sides of the liquid crystal panel, and which is configured to provide light to the liquid crystal panel.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
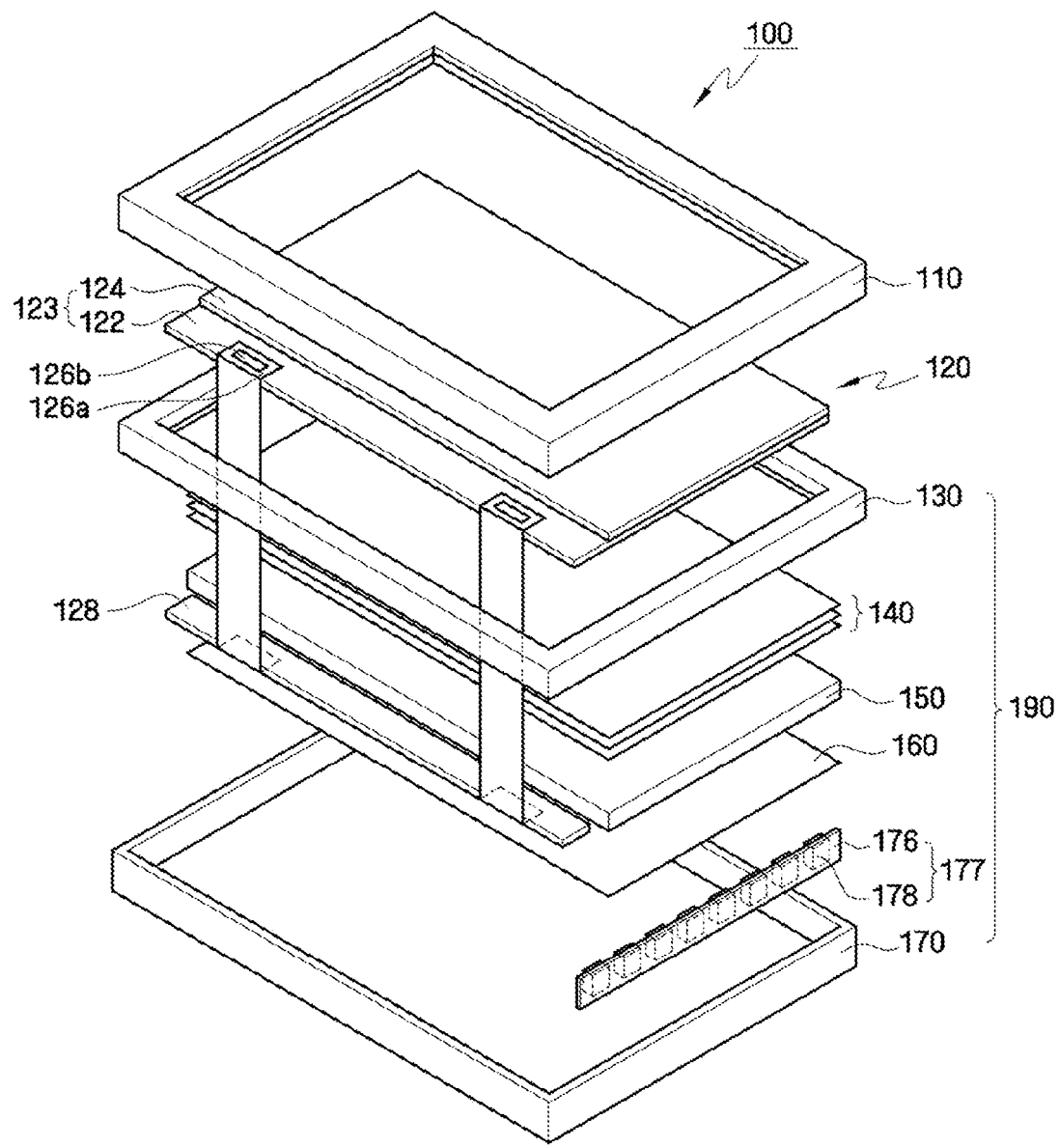
FIG. 1 is an exploded perspective view of a liquid crystal display (LCD) according to a first exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, sizes and relative sizes of layers and regions may be exaggerated for clarity As used herein, the singular forms "a", "an" and "the" are intended to include the plural forms as well, unless the context clearly indicates otherwise. It will be further understood that the terms "comprises" and/or "made of," when used in this specification, specify the presence of stated components, steps, operations, and/or elements, but do not preclude the presence or addition of one or more other components, steps, operations, elements, and/or groups thereof.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", "short", "long", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. It will also be understood that these terms are intended to encompass any specific values of dimensions for the elements or features to which they refer. Throughout the specification, like reference numerals in the drawings denote like elements.

Hereinafter, a liquid crystal display (LCD) according to a first exemplary embodiment will be described in detail with reference to FIGS. 1 through 5.

Figure 2:
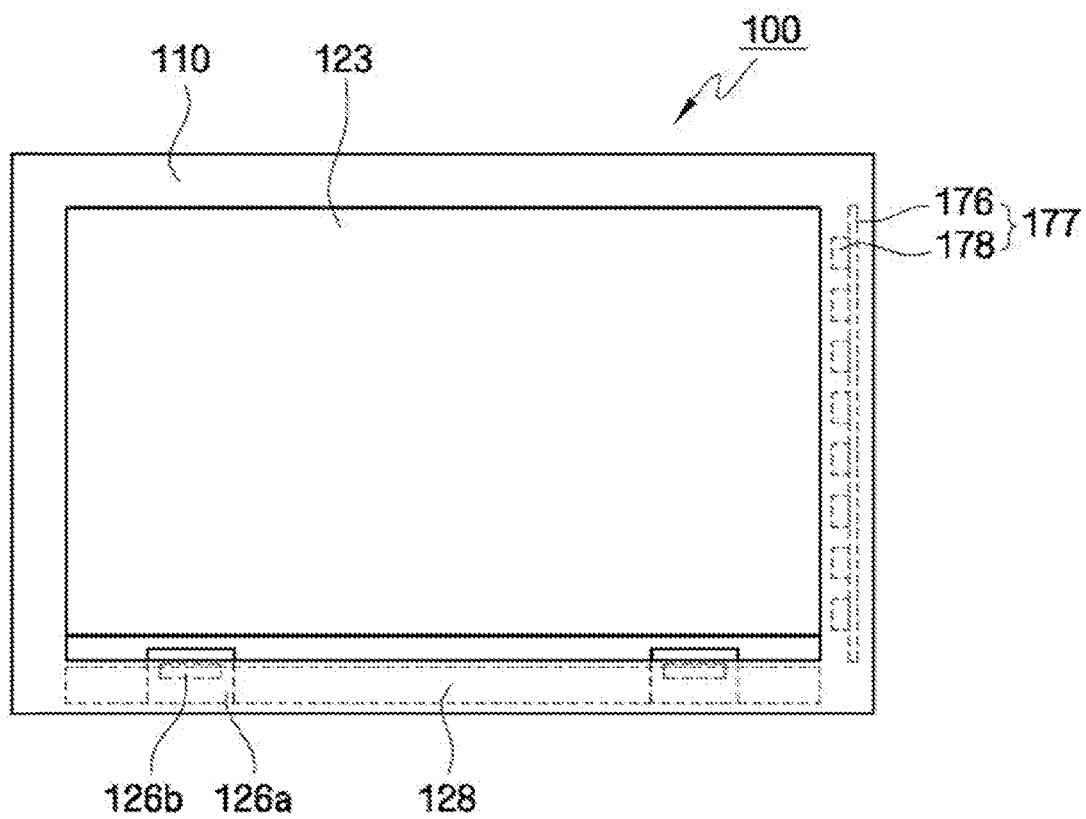
FIG. 2 is a front view of the LCD shown in FIG. 1.

FIG. 1 is an exploded perspective view of an LCD 100 according to a first exemplary embodiment of the present invention. FIG. 2 is a front view of the LCD 100 shown in FIG. 1.

Referring to FIGS. 1 and 2, the LCD 100 according to the first exemplary embodiment broadly includes a liquid crystal panel assembly 120, a backlight assembly 190, and an upper container 110.

The liquid crystal panel assembly 120 includes a liquid crystal panel 123, a circuit film 126a and a driver integrated circuit (IC) chip 126b, a first printed circuit board (PCB) 128, and the like.

The liquid crystal panel 123 includes a lower display substrate 122, an upper display substrate 124, and a liquid crystal layer. The lower display substrate 122 includes gate wirings, data wirings, a thin-film transistor (TFT) array, pixel electrodes, and the like. The upper display substrate 124 faces the lower display substrate 122, and a liquid crystal layer is interposed between the two display substrates 122 and 124. The liquid crystal panel 123 of this embodiment is generally shaped like a rectangle having short and long sides, and displays image information.

The gate wirings may extend substantially parallel to the long sides of the liquid crystal panel 123, and the data wirings may extend substantially parallel to the short sides of the liquid crystal panel 123. For example, the gate wirings may extend parallel to the long sides of the liquid crystal panel 123 or may extend in a zigzag (or other) fashion along a direction in which the long sides of the liquid crystal panel 123 extend. However, the present invention is not limited to these examples. In addition, the data wirings may extend parallel to the short sides of the liquid crystal panel 123 or may extend in a zigzag (or other) fashion along a direction in which the short sides of the liquid crystal panel 123 extend. However, the present invention is not limited to these examples.

When the LCD 100 is seen by a viewer, the short sides of the liquid crystal panel 123 may be located to the right and left of a viewing direction, and the long sides of the liquid crystal panel 123 may be located above and below the viewing direction. However, the present invention is not limited thereto, and the opposite case is also possible. It is also noted that the terms "short" and "long" as used herein do not refer to the absolute lengths of any structure. Rather, they refer to relative lengths. Thus, for example, certain sides of panel 123 may be referred to as "short" simply because they are shorter than the "long" sides of panel 123, not because they are less than some predetermined length. Conversely, some sides may be referred to as "long" simply because they are longer than the "short" sides.

The circuit film 126a and the driver IC chip 126b collectively include at least one data driver, and are disposed on a lower long side of the liquid crystal panel 123. The circuit film 126a and the driver IC chip 126b are connected to each data wiring formed on the lower display substrate 122, and provide a data driving signal to each data wiring. The circuit film 126a and the driver IC chip 126b may be formed in any suitable manner, but it is often desirable to form them as a tape carrier package (TCP) type or chip on film (COF) type in which the driver IC chip 126b is mounted on the circuit film 126a.

In addition, a gate driver is connected to each gate wiring formed on the lower display substrate 122, and provides a gate driving signal to each gate wiring. For example, the gate driver may be formed as an integrated circuit on the lower display substrate 122. Here, the gate driver may be formed along a left or right short side of a front surface of the lower display substrate 122. The gate driver may be formed during the process of manufacturing the TFT array. The present invention is not limited to the above example, and the gate driver may also be manufactured in the same form as the circuit film 126a and the driver IC chip 126b.

Various driving parts (not shown) are mounted on the first PCB 128 to process gate driving signals which are to be input to the gate driver, and data driving signals which are to be input to the data driver. In other words, the first PCB 128 is connected to the liquid crystal panel 123 and provides image information to the liquid crystal panel 123. The first PCB 128 is connected to an external control device (not shown) by an interface film (not shown) and receives various signals for displaying images.

In this embodiment, the first PCB 128 is disposed along a long side of the liquid crystal panel 123. To minimize the thickness of the LCD 100, the first PCB 128 may be placed in approximately the same plane as a light guide plate (LGP) 150. In addition, the first PCB 128 may be placed within a lower container 170 and may be interposed between the LGP 150 and a lower sidewall of the lower container 170. In the conventional art, a light source is disposed between the LGP 150 and the lower sidewall of the lower container 170, and the first PCB 128 is placed outside the lower container 170. In the current exemplary embodiment, however, a light source 177 is disposed between the LGP 150 and a left or right sidewall of the lower container 170 which is parallel to a short side of the liquid crystal panel 123, and the first PCB 128 is disposed between the LGP 150 and the lower sidewall of the lower container 170 which is parallel to a long side of the liquid crystal panel 123. Accordingly, the LCD 100 becomes slimmer.

An end of the circuit film 126*a* may be connected to the liquid crystal panel 123 by an anisotropic conductive film (not shown). The other end of the circuit film 126*a* may be connected to the first PCB 128 by a connector 182 (see FIG. 4A). The connector 182 may be formed on a rear surface of the first PCB 128. The circuit film 126*a* may extend to the first PCB 128 via an inner surface of a sidewall of a mold frame 130, to be connected to the first PCB 128.

In the current exemplary embodiment, a timing controller is not formed on the first PCB 128 but is embedded in the driver IC chip 126*b*. Thus, the size of the first PCB 128 can be reduced. Due to its reduced size, the first PCB 128 can be placed between the LGP 150 and an inner surface of the lower sidewall of the lower container 170. The first PCB 128 and the driver IC chip 126*b* will be described in more detail later.

The backlight assembly 190 includes mold frame 130, optical sheets 140, LGP 150, reflective sheet 160, light source 177, lower container 170, and the like.

The LGP 150 more uniformly provides light from the light source 177 to the liquid crystal panel 123. The LGP 150 has the light source 177 disposed on at least one side thereof, and is accommodated in the lower container 170. Like the liquid crystal panel 123, the LGP 150 may be shaped like, e.g., a rectangular plate. However, the present invention is not limited thereto. When point light source elements 178 such as light-emitting diodes (LEDs) are used, the LGP 150 may be formed with various patterns, such as grooves or protrusions, according to the positions of the point light source elements 178.

For ease of description, it is assumed that the LGP 150 is a substantially planar plate. However, the LGP 150 may also be formed as a sheet or a film in order to make the LCD 100 slimmer. That is, the LGP 150 may be any structure, such as a plate or film, that can guide light. The LGP 150 may be made of a material having light-transmitting properties, such as acrylic resin (e.g., polymethyl methacrylate (PMMA)), or a material such as polycarbonate (PC).

A pattern may be formed on at least one surface of the LGP 150. For example, a diffusion pattern (not shown) may be formed on a bottom surface of the LGP 150 such that light guided by the LGP 150 can travel upward.

The light source 177 is located on a side of the LGP 150. In the current exemplary embodiment, the light source 177, unlike the first PCB 128, is located on a short side of the LGP 150, i.e. parallel to a short side of the liquid crystal panel 123. That is, the light source 177 is disposed along a short side of the liquid crystal panel 123. The light source 177 is placed between the LGP 150 and an inner surface of a sidewall of the lower container 170.

The light source 177 includes a second PCB 176 on which a circuit pattern is formed, as well as point light source elements 178 which are mounted on the second PCB 176. Here, the second PCB 176 may be a flexible PCB (FPCB), a rigid PCB (RPCB), a metal PCB (MPCB), a metal core PCB (MCPCB), or the like.

The point light source elements 178 include light-emitting elements that emit light. Examples of the point light source elements 178 include LEDs, incandescent lamps, and white halogen lamps. In particular, LEDs are often preferred due to their superior color reproducibility and low power consumption. Each of the point light source elements 178 can include a frame (not shown) and red (R), green (G) and blue (B) light-emitting chips mounted inside the frame. Red light, green light and blue light emitted respectively from the R, G, and B light-emitting chips mixes to produce white light.

The optical sheets 140 are disposed on the LGP 150 to diffuse and concentrate light from the light source 177. The optical sheets 140 may include a diffusion sheet, a prism sheet, and a protective sheet. The diffusion sheet may diffuse light from the LGP 150 to prevent the light from being concentrated in a specific area. The prism sheet may have a predetermined array of triangular (or otherwise-shaped) prisms on a surface thereof. The prism sheet may be disposed on the diffusion sheet to concentrate light, which is diffused by the diffusion sheet, in a direction perpendicular to the liquid crystal panel 123. The protective sheet may be disposed on the prism sheet to protect an upper surface of the prism sheet, and may diffuse light for more uniform light distribution.

The reflective sheet 160 is located between the LGP 150 and a bottom surface of the lower container 170. The reflective sheet 160 reflects light, which is emitted downward from the LGP 150, toward the liquid crystal panel 123, thereby increasing the efficiency of the light, i.e. the amount of light generated by the light source 177 that falls incident to the panel 123.

To be reflective, the reflective sheet 160 may be made of, e.g., polyethylene terephthalate (PET). In addition, a surface of the reflective sheet 160 may be coated with a diffusion layer containing, e.g., titanium dioxide. The reflective sheet 160 may also be made of metal such as silver (Ag).

The mold frame 130 of this embodiment is shaped like a rectangular frame, and is disposed along edges of an upper surface of the optical sheets 140. The mold frame 130 is coupled to the lower container 170 to accommodate the optical sheets 140, the LGP 150, the reflective sheet 160, the light source 177, and the first PCB 128 therein. Any relative sizes of the mold frame 130 and lower container 170 are contemplated. However, in this embodiment, sidewalls of the mold frame 130 may be located outside the sidewalls of the lower container 170. The mold frame 130 and the lower container 170 may be coupled to each other by any suitable mechanisms, such as hooks or screws.

The liquid crystal panel 123 is disposed on the mold frame 130. The upper container 110 covers edges of an upper surface of the liquid crystal panel 123, and is coupled to the lower container 170 or the mold frame 130.

Figure 3A:
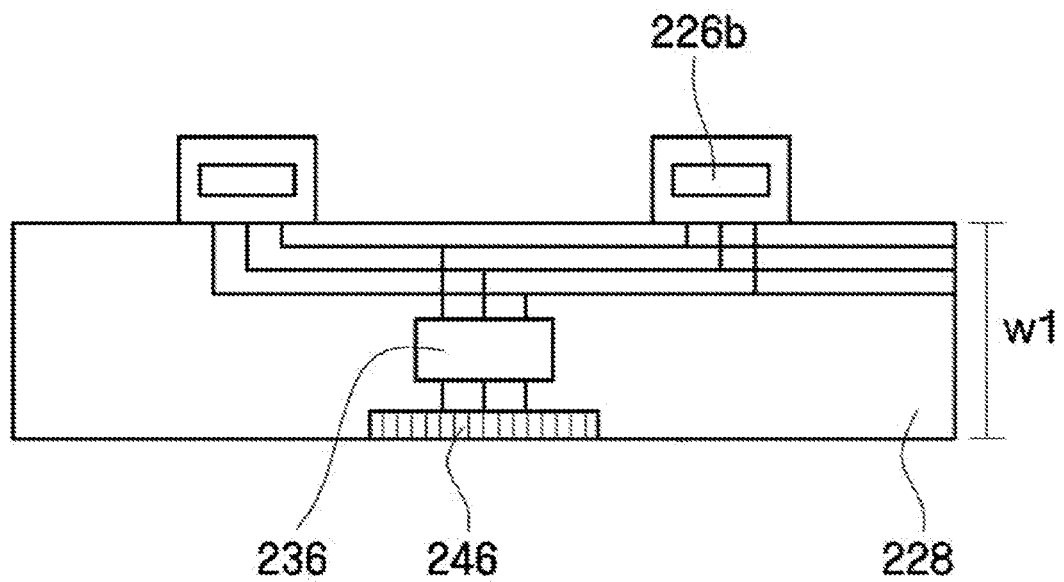
FIG. 3A is a diagram illustrating a conventional first printed circuit board (PCB) and a conventional driver integrated circuit (IC) chip.
Figure 3B:
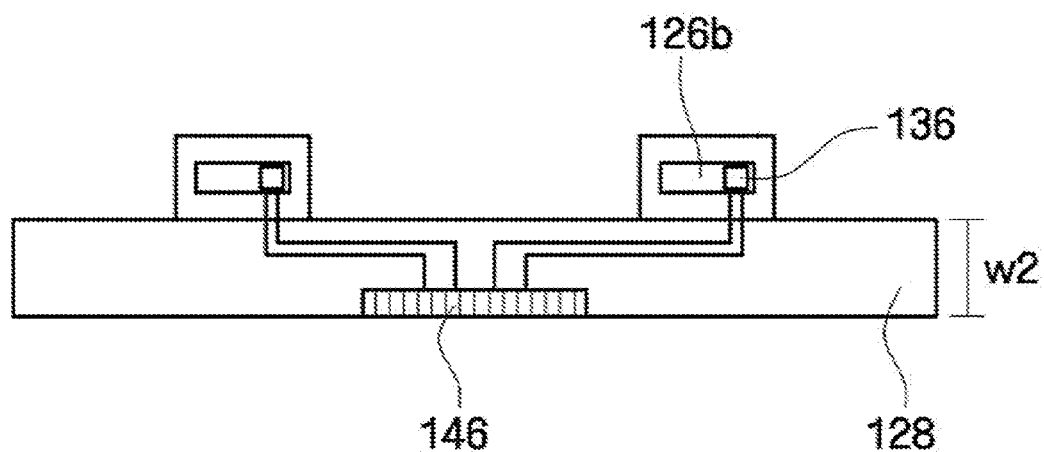
FIG. 3B is a diagram illustrating a first PCB and a driver IC chip shown in FIGS. 1 and 2.

The first PCB 128 and the driver IC chip 226b shown in FIGS. 1 and 2 will now be described in more detail with reference to FIGS. 3A and 3B. FIG. 3A is a diagram illustrating a conventional first PCB 228 and a conventional driver IC chip 226b. FIG. 3B is a diagram illustrating the first PCB 128 and the driver IC chip 126b shown in FIGS. 1 and 2.

Referring to FIG. 3A, a timing controller 236 receives RGB data for displaying images, a data enable signal indicating a frame time, vertical and horizontal synchronization signals, and a clock signal from an external system via a signal connector 246. The timing controller 236 also transmits data for displaying images to the driver IC chip 226b. The conventional timing controller 236 and the conventional driver IC chip 226b are formed as separate chips, and the timing controller 236 is formed on the first PCB 228. Forming the timing controller 236 on the first PCB 228 causes an increase in the size of the first PCB 228. For example, width w1 of the first PCB 228 on which the timing controller 236 is typically in the range of 8.5 to 11 mm.

In contrast, referring to FIG. 3B, a timing controller 136 is embedded in the driver IC chip 126b. Signals received from an external system via a signal connector 146 may be delivered directly to the timing controller 136 embedded in the driver IC chip 126b and the driver IC chip 126b. Accordingly, functions performed by the conventional timing controller 236 can instead be carried out in the driver IC chip 126b. In this embodiment, since the timing controller 136 is embedded in the driver IC chip 126b, there is no need to form the timing controller 136 on the first PCB 128. Hence, a width w2 of the first PCB 128 can be reduced. Accordingly, the width w2 of the first PCB 128 may be less than w1, e.g. approximately 6 mm or perhaps even less.

In the current exemplary embodiment, since the width w2 of the first PCB 128 can be reduced, the first PCB 128 can be placed in approximately the same plane as that occupied by the LGP 150, and can be disposed between the LGP 150 and the inner surface of the lower sidewall of the lower container 170.

Figure 4A:
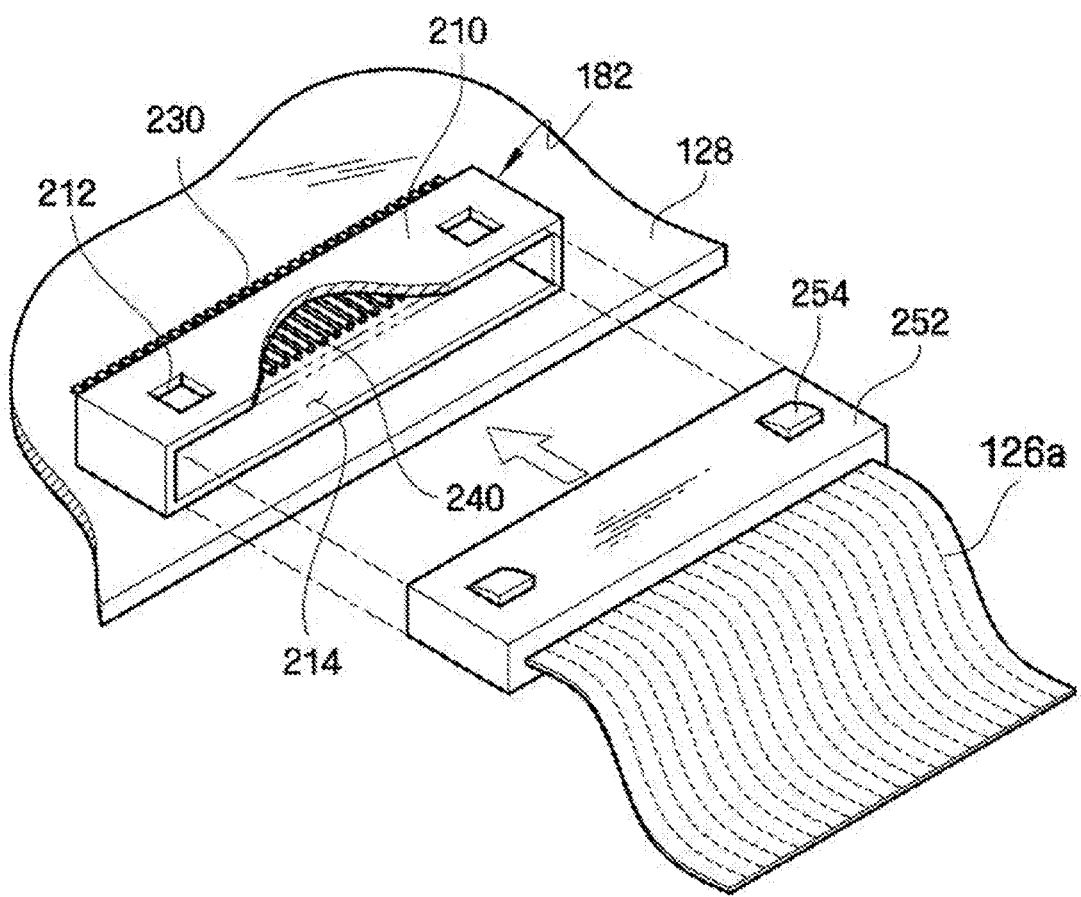
FIG. 4A is a perspective view illustrating the coupling relationship between the first PCB and a circuit film shown in FIG. 1.
Figure 4B:
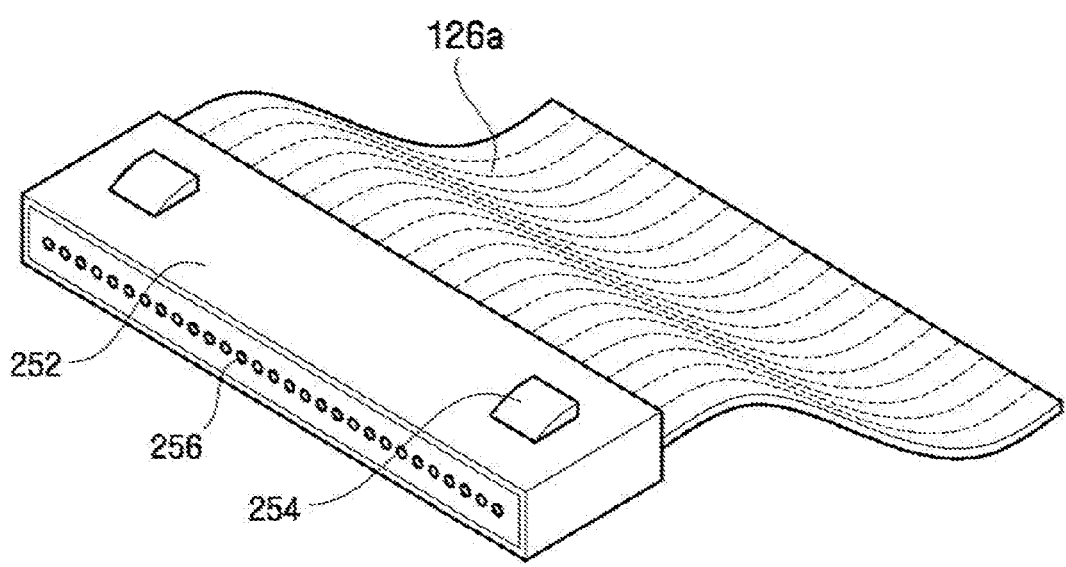
FIG. 4B is a perspective view of the circuit film shown in FIG. 4A.

The coupling relationship between the first PCB 128 and the circuit film 126a shown in FIG. 1 will now be described in more detail with reference to FIGS. 4A and 4B. FIG. 4A is a perspective view illustrating the coupling relationship between the first PCB 128 and the circuit film 126a shown in FIG. 1. FIG. 4B is a perspective view of the circuit film 126a shown in FIG. 4A.

Referring to FIGS. 4A and 4B, the connector 182 includes a housing 210 which is made of an insulator, a plurality of lead lines 230 which are formed on a side of the housing 210, and a slot 214 which is formed on the other side of the housing 210.

The lead lines 230 are relatively densely arranged on a side of the housing 210, and extend a predetermined distance from an outer surface of the housing 210. Each of the lead lines 230 is electrically connected to a circuit pattern which is formed on the first PCB 128, by, e.g., soldering.

The slot 214 is formed on the other side of the housing 210, and a cable holder 252 is inserted into the slot 214. Here, a plurality of pins 240 are arranged within the slot 214. Each of the lead lines 230 is connected to a respective one of the pins 240.

The connector 182 and the cable holder 252 are designed to be hooked, or otherwise coupled, to each other. To this end, the housing 210 has hook holes 212.

The cable holder 252, made of an insulator, is formed at an end of the circuit film 126a and is, as described above, inserted into the slot 214. A plurality of pin holes 256 are arranged along a side surface of the cable holder 252 which is not connected to the circuit film 126a (generally, though not necessarily, the pin holes 256 are arranged along a side of holder 252 opposite to that of circuit film 126a). The pin holes 256 are connected respectively to a plurality of wirings.

Hooks 254 are formed on a surface of the cable holder 252 to correspond respectively to the hook holes 212 of the housing 210. The hooks 254 allow the cable holder 252 to be inserted into the slot 214 and be hooked to the housing 210. The positions of the hooks 254 and the hook holes 212 may be reversed. In the current exemplary embodiment, a case where the cable holder 252 and the housing 210 are hooked to each other has been described as an example. However, the present invention is not limited to this case, and the cable holder 252 and the housing 210 can be coupled to each other by using any suitable coupling mechanism(s).

The current exemplary embodiment presents an example in which the first PCB 128 and the circuit film 126a are connected to each other by the connector 182. However, the present invention is not limited to this case, and the first PCB 128 and the circuit film 126a can be connected to each other by any other suitable mechanism, for example by thermocompression that uses an anisotropic conductive film.

Figure 5:
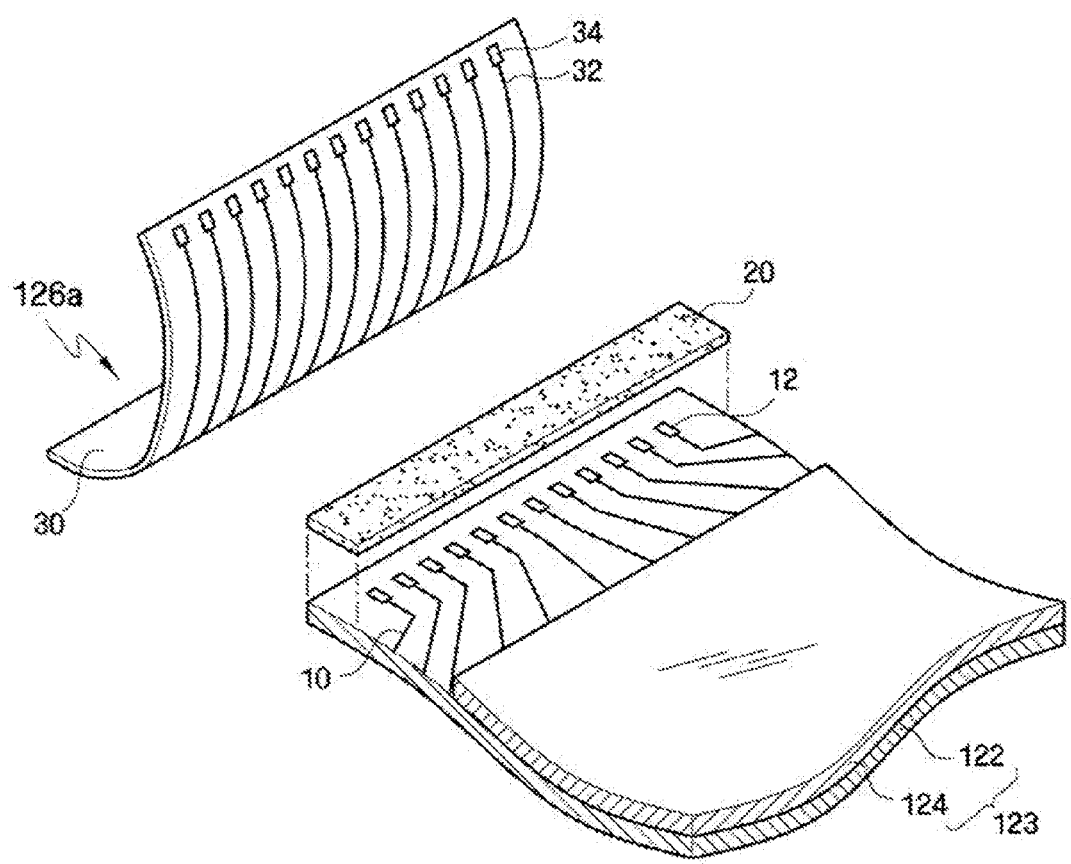
FIG. 5 is a perspective view illustrating the coupling relationship between the circuit film and a liquid crystal panel shown in FIG. 1.

The coupling relationship between the circuit film 126a and the liquid crystal panel 123 shown in FIG. 1 will now be described in more detail with reference to FIG. 5. FIG. 5 is a perspective view illustrating the coupling relationship between the circuit film 126a and the liquid crystal panel 123 shown in FIG. 1.

Referring to FIG. 5, data wirings 10 are formed on the lower display substrate 122 of the liquid crystal panel 123, and a data pad 12 is formed at an end of each of the data wirings 10. The circuit film 126a includes wiring patterns 32 and a wiring pad 34 formed at an end of each of the wiring patterns 32. An anisotropic conductive film 20 is attached to the data pads 12, and the circuit film 126a is placed on the anisotropic conductive film 20. After the data pads 12 are aligned respectively with the wiring pads 34, the circuit film 126a is attached to the lower display substrate 122 of the liquid crystal panel 123 by thermocompression. The anisotropic conductive film 20 includes a resin film and conductive particles dispersed in the resin film. Thermocompression causes the conductive particles of the conductive film 20 to interpose themselves between the data pads 12 and the wiring pads 34, thereby electrically connecting the data pads 12 and the wiring pads 34. Regions other than the pads 12 and 34 are bonded by the resin film.

Figure 6:
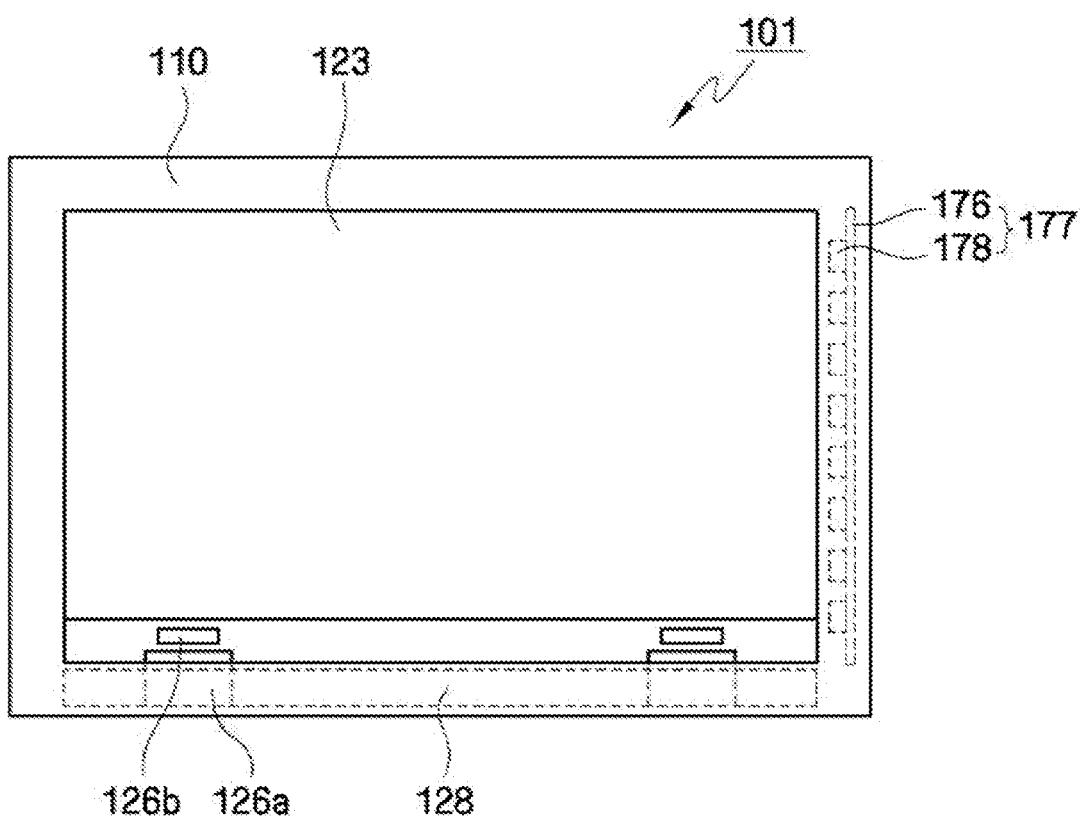
FIG. 6 is a front view of an LCD according to a second exemplary embodiment of the present invention.

Hereinafter, an LCD according to a second exemplary embodiment of the present invention will be described with reference to FIG. 6. FIG. 6 is a front view of an LCD 101 according to a second exemplary embodiment of the present invention. For the sake of simplicity, elements having the same functions as those illustrated in the drawings of the previous exemplary embodiment are indicated by like reference numerals, and thus their description will be largely omitted. The following description will focus mostly on differences from the previous exemplary embodiment.

In the LCD 101 according to the second exemplary embodiment, each driver IC chip 126b is mounted on a liquid crystal panel 123 in a chip on glass (COG) type configuration. Each driver IC chip 126b and a first PCB 128 are electrically connected to each other by a circuit film 126a which is disposed on a lower long side of the liquid crystal panel 123.

For ease of description, subsequent exemplary embodiments of the present invention will be described based on a case where the driver IC chip 126*b* is mounted on the circuit film 126*a*. However, it is obvious that the driver IC chip 126*b* and the circuit film 126*a* can also be formed in a COG type configuration.

Figure 7:
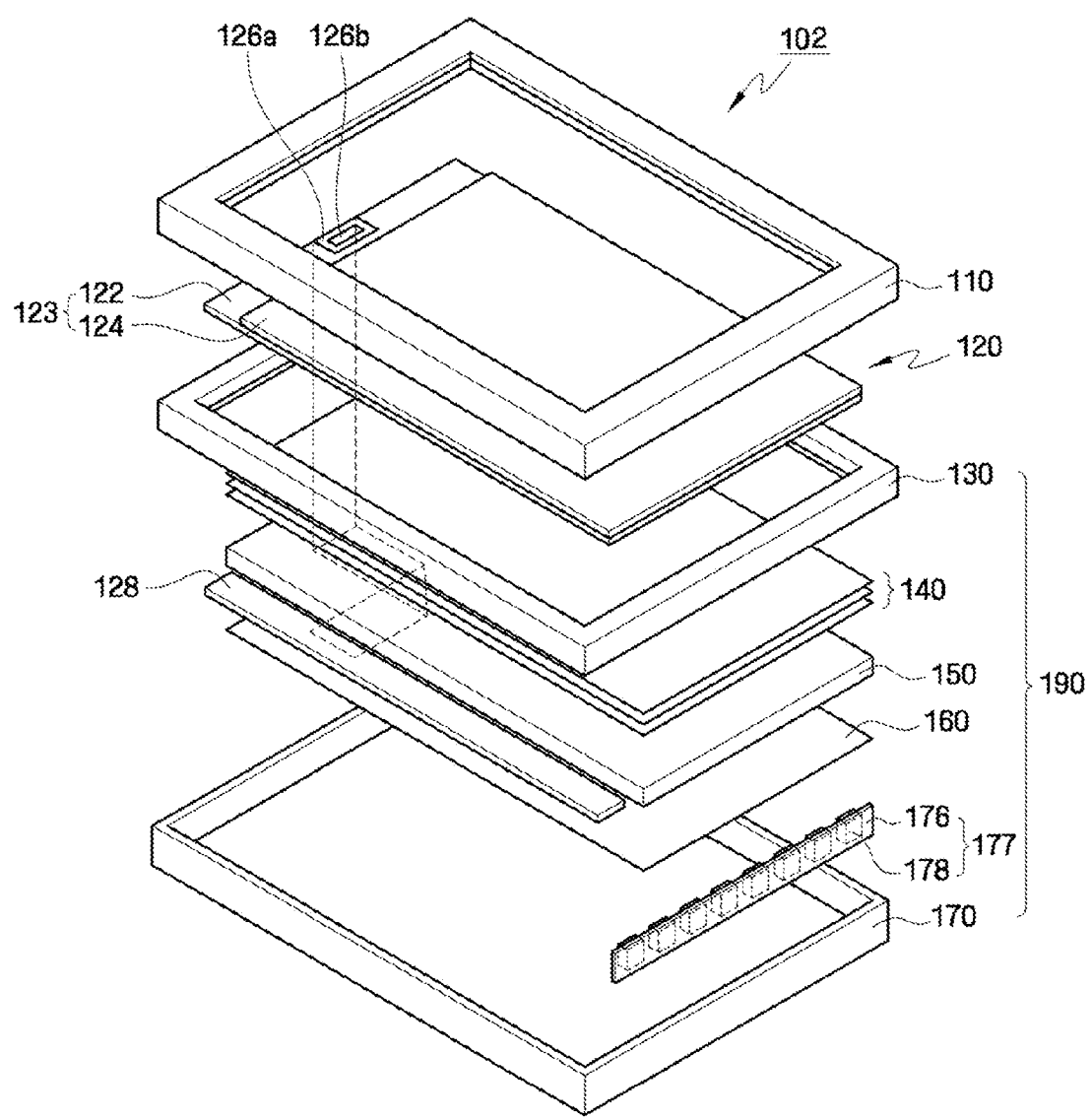
FIG. 7 is an exploded perspective view of an LCD according to a third exemplary embodiment of the present invention.
Figure 8:
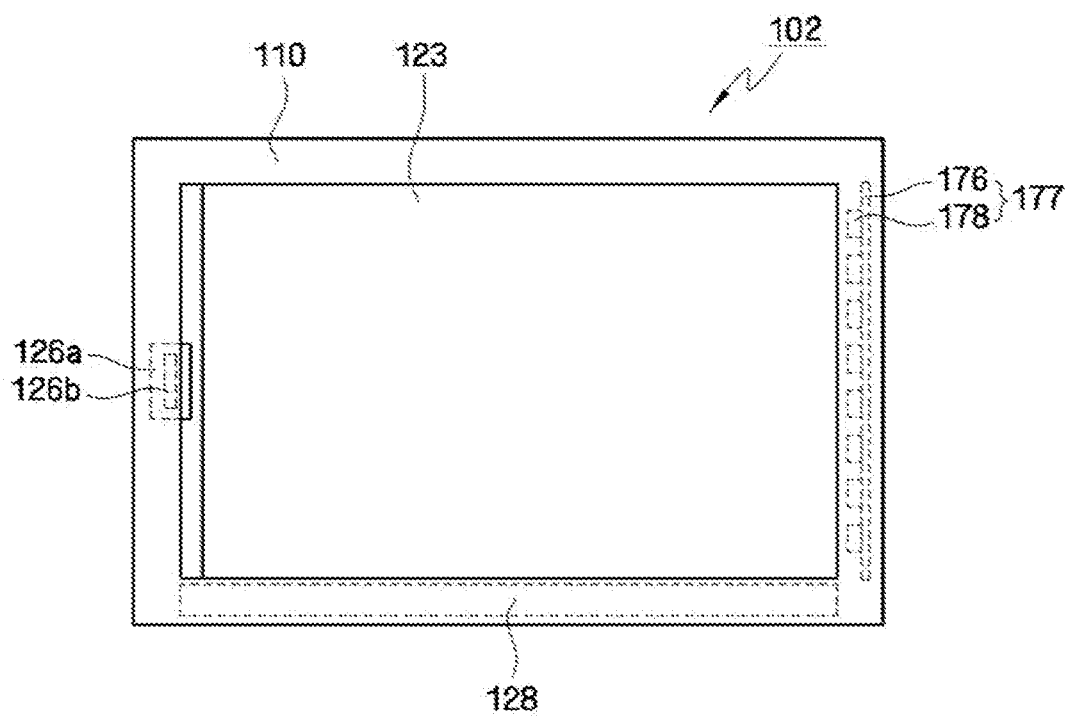
FIG. 8 is a front view of the LCD shown in FIG. 7.

Hereinafter, an LCD according to a third exemplary embodiment of the present invention will be described with reference to FIGS. 7 and 8. FIG. 7 is an exploded perspective view of an LCD 102 according to a third exemplary embodiment of the present invention. FIG. 8 is a front view of the LCD 102 shown in FIG. 7. For the sake of simplicity, elements having the same functions as those illustrated in the drawings of the previous exemplary embodiments are indicated by like reference numerals, and thus their description will be largely omitted. The following description will mostly focus on differences from the previous exemplary embodiments.

In the LCD 102 according to the third exemplary embodiment, a first PCB 128 is disposed along a long side of a liquid crystal panel 123. The first PCB 128 may be placed between an LGP 150, and a lower sidewall of a lower container 170 which is parallel to a lower long side of the liquid crystal panel 123.

A light source 177 is disposed along a short side of the liquid crystal panel 123. The light source 177 may be placed between the LGP 150, and a sidewall of the lower container 170 which is parallel to a short side of the liquid crystal panel 123.

A driver IC chip 126*b* and a circuit film 126*a* may be disposed on a short side of the liquid crystal panel 123. The driver IC chip 126*b* and the circuit film 126*a* may be disposed on a short side of the liquid crystal panel 123, opposite to the light source 177. An end of the circuit film 126*a* is connected to the liquid crystal panel 123, and the other end of the circuit film 126*a* is connected to the first PCB 128. The circuit film 126*a* may be bent at a short side of a reflective sheet 160 and extend in a direction generally parallel to long sides of the liquid crystal panel 123. Then, the circuit film 126*a* may be folded once and may extend toward the first PCB 128. Alternatively, the circuit film 126*a* may be bent at the short side of the reflective sheet 160 and extend in a direction generally parallel to the long sides of the liquid crystal panel 123. Then, the circuit film 126*a* may extend toward the first PCB 128 without being folded. In this manner, bends in the circuit film 126*a* produce portions of the circuit film 126*a* that extend in differing directions, so as to allow for effective yet space-saving routing of wires between PCB 128 and IC chip 126*b*.

In the current exemplary embodiment, the driver IC chip 126*b* is disposed on a short side of the liquid crystal panel 123. Here, gate wirings may extend substantially parallel to the short sides of the liquid crystal panel 123, and data wirings may extend substantially parallel to the long sides of the liquid crystal panel 123. When the data wirings are formed to extend substantially parallel to the long sides of the liquid crystal panel 123, the number of channels in the data driver can be reduced to two-thirds of the number of channels required when the data wirings are formed to extend substantially parallel to the short sides of the liquid crystal panel 123.

Figure 9:
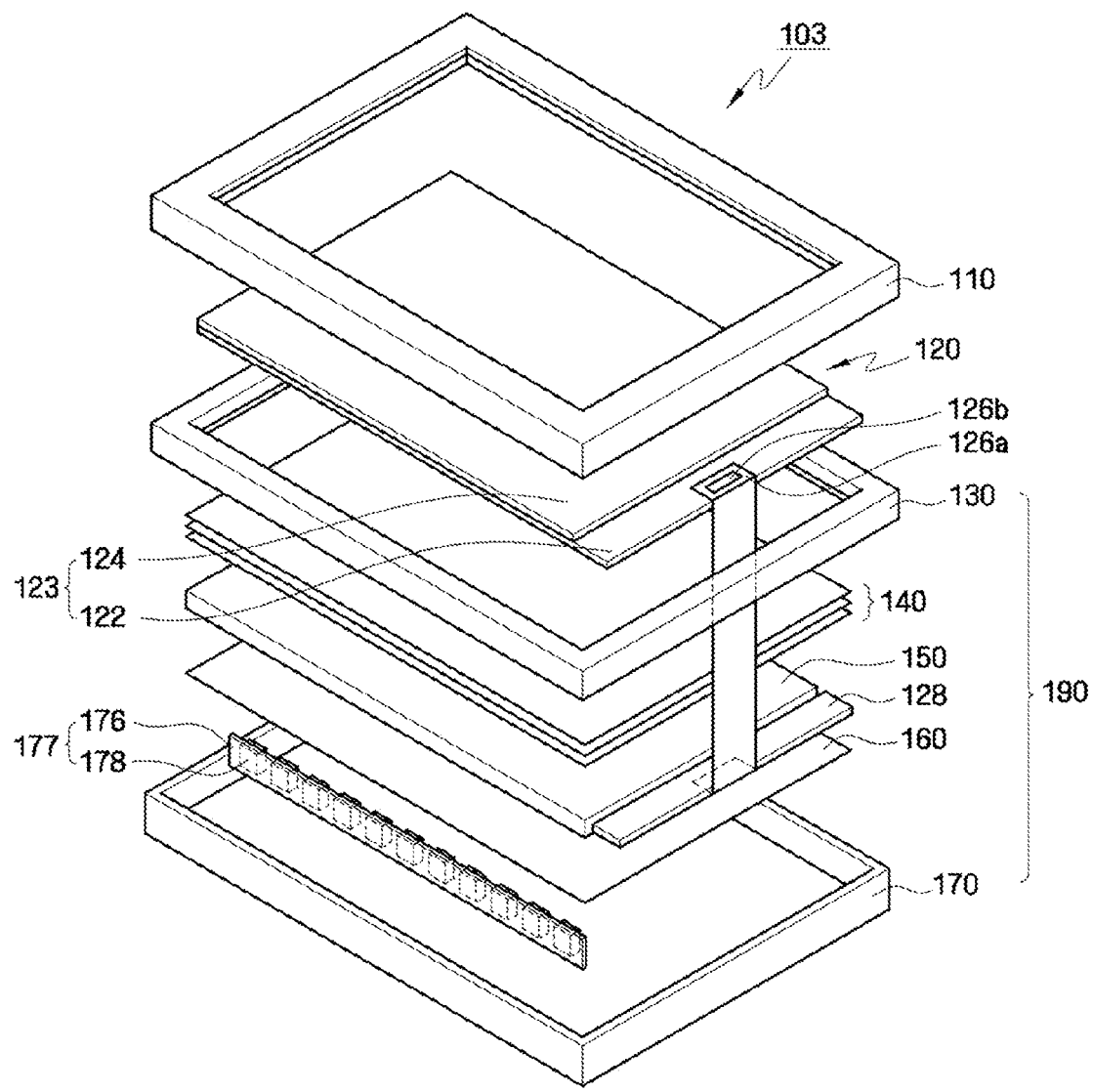
FIG. 9 is an exploded perspective view of an LCD according to a fourth exemplary embodiment of the present invention.
Figure 10:
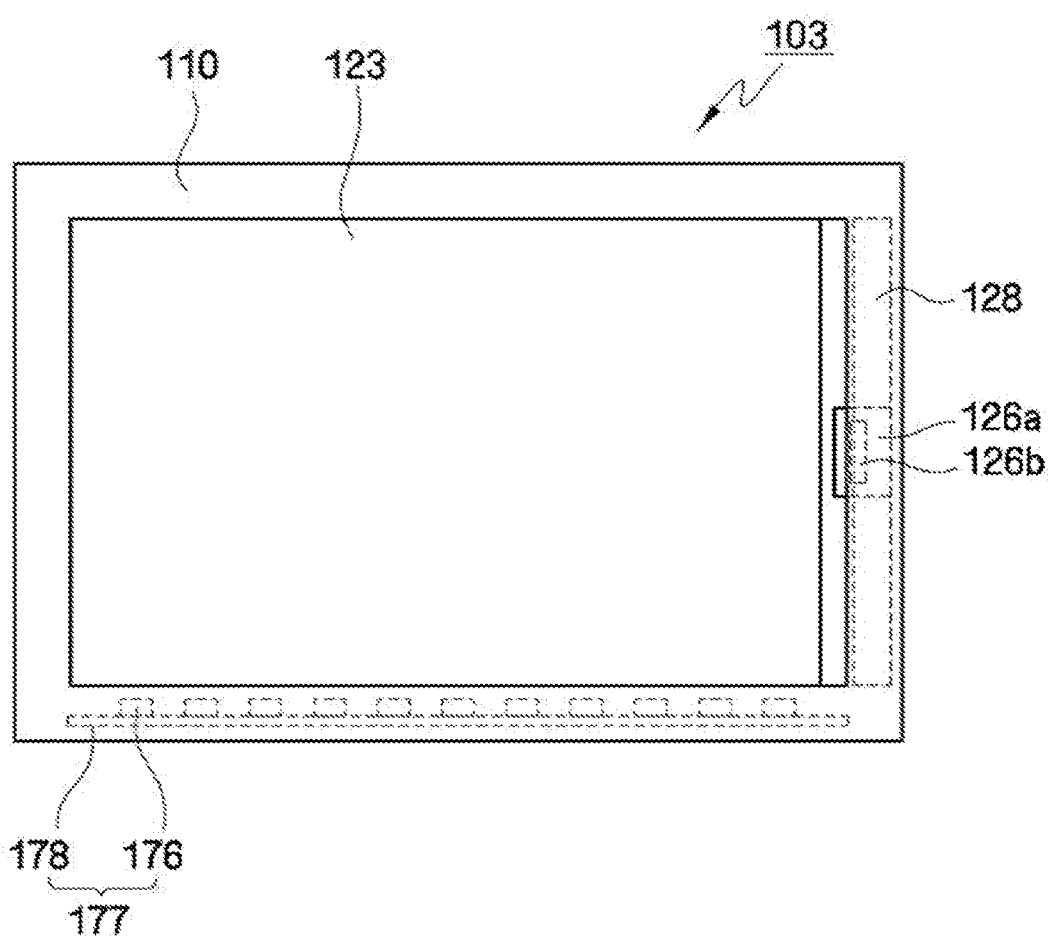
FIG. 10 is a front view of the LCD shown in FIG. 9.

Hereinafter, an LCD according to a fourth exemplary embodiment of the present invention will be described with reference to FIGS. 9 and 10. FIG. 9 is an exploded perspective view of an LCD 103 according to a fourth exemplary embodiment of the present invention. FIG. 10 is a front view of the LCD 103 shown in FIG. 9. For the sake of simplicity, elements having the same functions as those illustrated in the drawings of the previous exemplary embodiments are indicated by like reference numerals, and thus their description will be largely omitted. The following description will focus mostly on differences from the previous exemplary embodiments.

In the LCD 103 according to the fourth exemplary embodiment of the present invention, a first PCB 128 is disposed along a short side of a liquid crystal panel 123. The first PCB 123 may be placed between an LGP 150 and a right or left sidewall of a lower container 170 which is parallel to a short side of the liquid crystal panel 123.

Point light source elements 178 and a second PCB 176, which collectively form a light source 177, are disposed on a side of the LGP 150 along a lower long side of the liquid crystal panel 123. Specifically, the point light source elements 178 may be installed in a lower part of the LCD 103.

A driver IC chip 126*b* and a circuit film 126*a* may be disposed on a short side of the liquid crystal panel 123. Specifically, the driver IC chip 126*b* and the circuit film 126*a* may be disposed on a short side of the liquid crystal panel 123 which is adjacent to the first PCB 128.

In the current exemplary embodiment, the driver IC chip 126*b* is disposed on a short side of the liquid crystal panel 123. Here, gate wirings may extend substantially parallel to the short sides of the liquid crystal panel 123, and data wirings may extend substantially parallel to the long sides of the liquid crystal panel 123.

Figure 11:
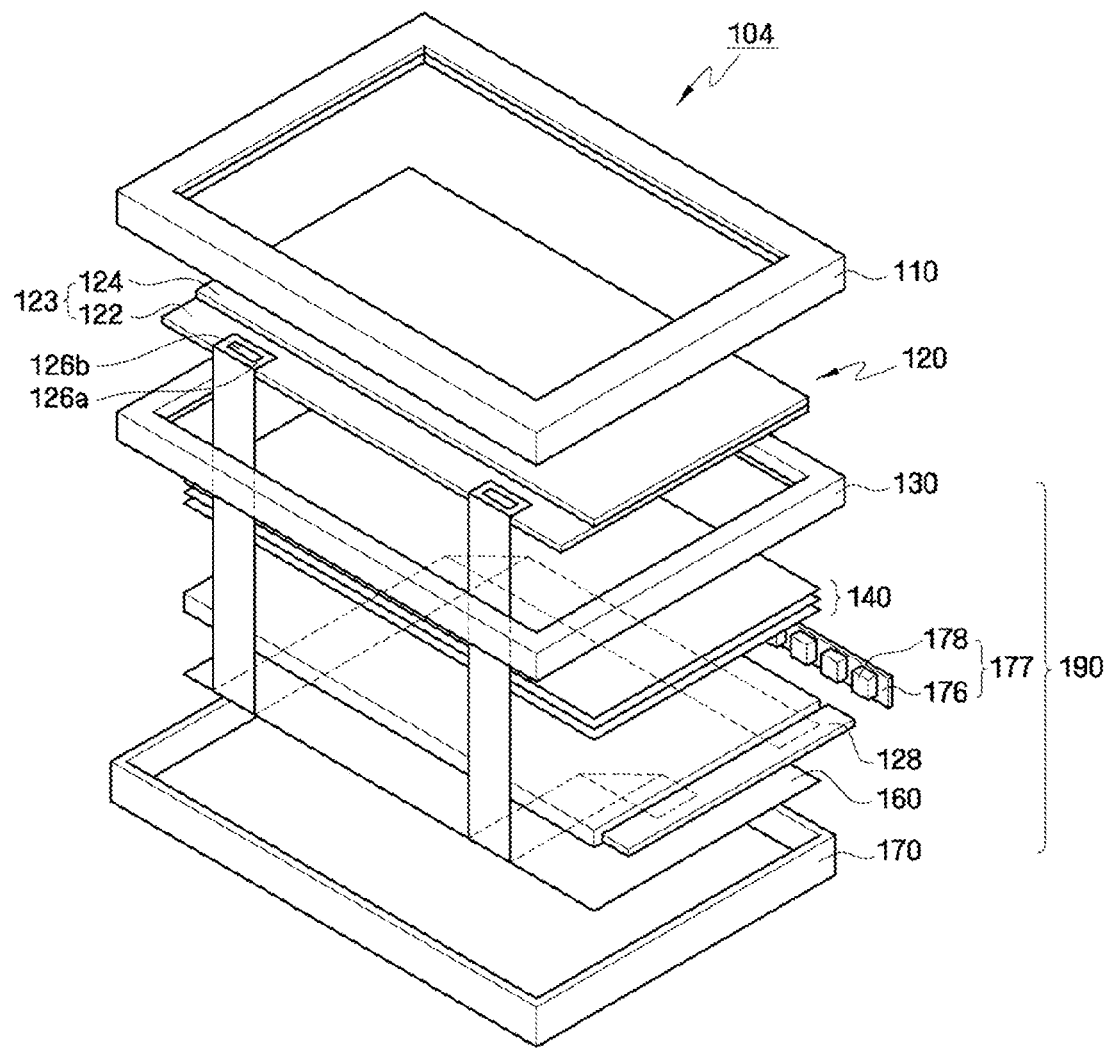
FIG. 11 is an exploded perspective view of an LCD according to a fifth exemplary embodiment of the present invention.
Figure 12:
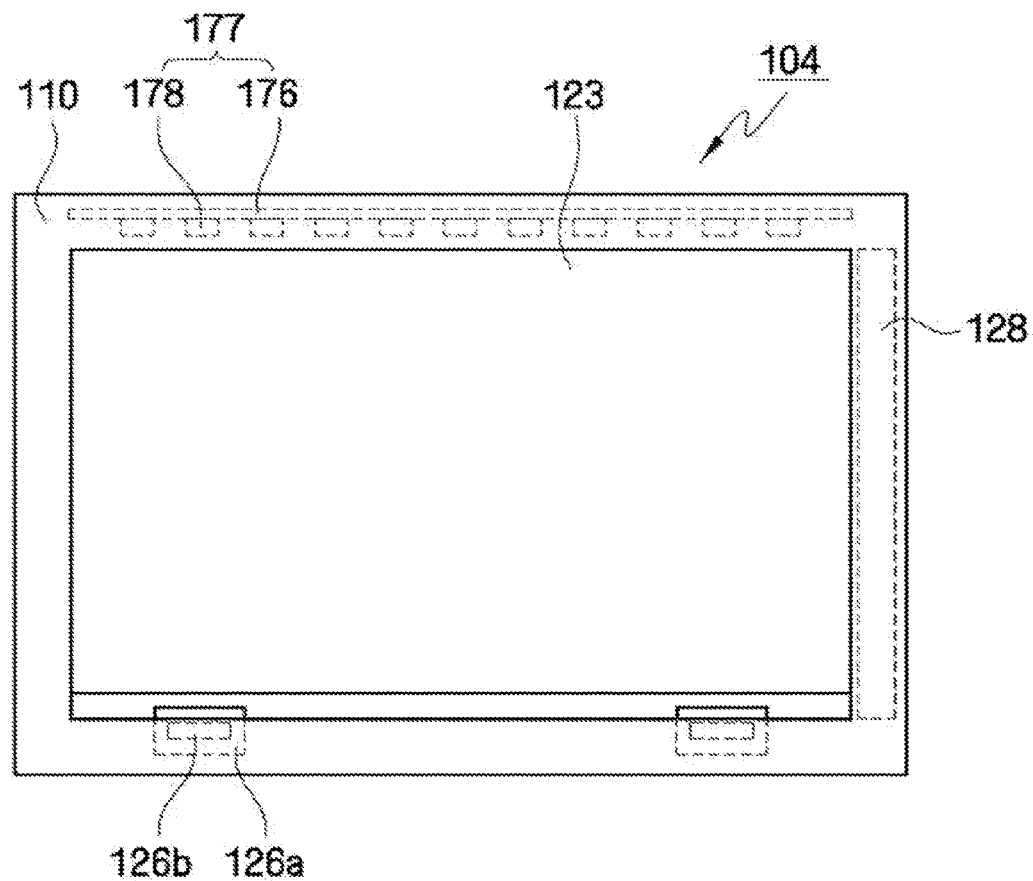
FIG. 12 is a front view of the LCD shown in FIG. 11.

Hereinafter, an LCD according to a fifth exemplary embodiment of the present invention will be described with reference to FIGS. 11 and 12. FIG. 11 is an exploded perspective view of an LCD 104 according to a fifth exemplary embodiment of the present invention. FIG. 12 is a front view of the LCD 104 shown in FIG. 11. For the sake of simplicity, elements having the same functions as those illustrated in the drawings of the previous exemplary embodiments are indicated by like reference numerals, and thus their description will be largely omitted. The following description will focus mostly on differences from the previous exemplary embodiments.

In the LCD 104 according to the fifth exemplary embodiment, a first PCB 128 is disposed along a short side of a liquid crystal panel 123. The first PCB 128 may be placed between an LGP 150 and a right or left sidewall of a lower container 170 which is parallel to a short side of the liquid crystal panel 123.

A light source 177 is disposed along a long side of the liquid crystal panel 123. The light source 177 may be placed between the LGP 150, and a sidewall of the lower container 170 which is parallel to an upper long side of the liquid crystal panel 123. The light source 177 may be installed in an upper part of the liquid crystal panel 123.

A driver IC chip 126*b* and a circuit film 126*a* may be disposed on a long side of the liquid crystal panel 123. The driver IC chip 126*b* and the circuit film 126*a* may be disposed on a long side of the liquid crystal panel 123 which faces the other long side thereof which is adjacent to the light source 177. An end of the circuit film 126*a* is connected to the liquid crystal panel 123, and the other end of the circuit film 126*a* is connected to the first PCB 128. The circuit film 126*a* may be bent at a long side of a reflective sheet 160, and may extend in a direction substantially parallel to short sides of the liquid crystal panel 123. Then, the circuit film 126*a* may be folded once and extend toward the first PCB 128. Alternatively, the circuit film 126*a* may be bent at the long side of the reflective sheet 160 and extend in a direction generally parallel to the shorts sides of the liquid crystal panel 123. Then, the circuit film 126*a* may extend toward the first PCB 128 without being folded.

In the current exemplary embodiment, the driver IC chip 126b is disposed on a long side of the liquid crystal panel 123. Here, gate wirings may extend substantially parallel to the long sides of the liquid crystal panel 123, and data wirings may extend substantially parallel to the short sides of the liquid crystal panel 123.

Figure 13:
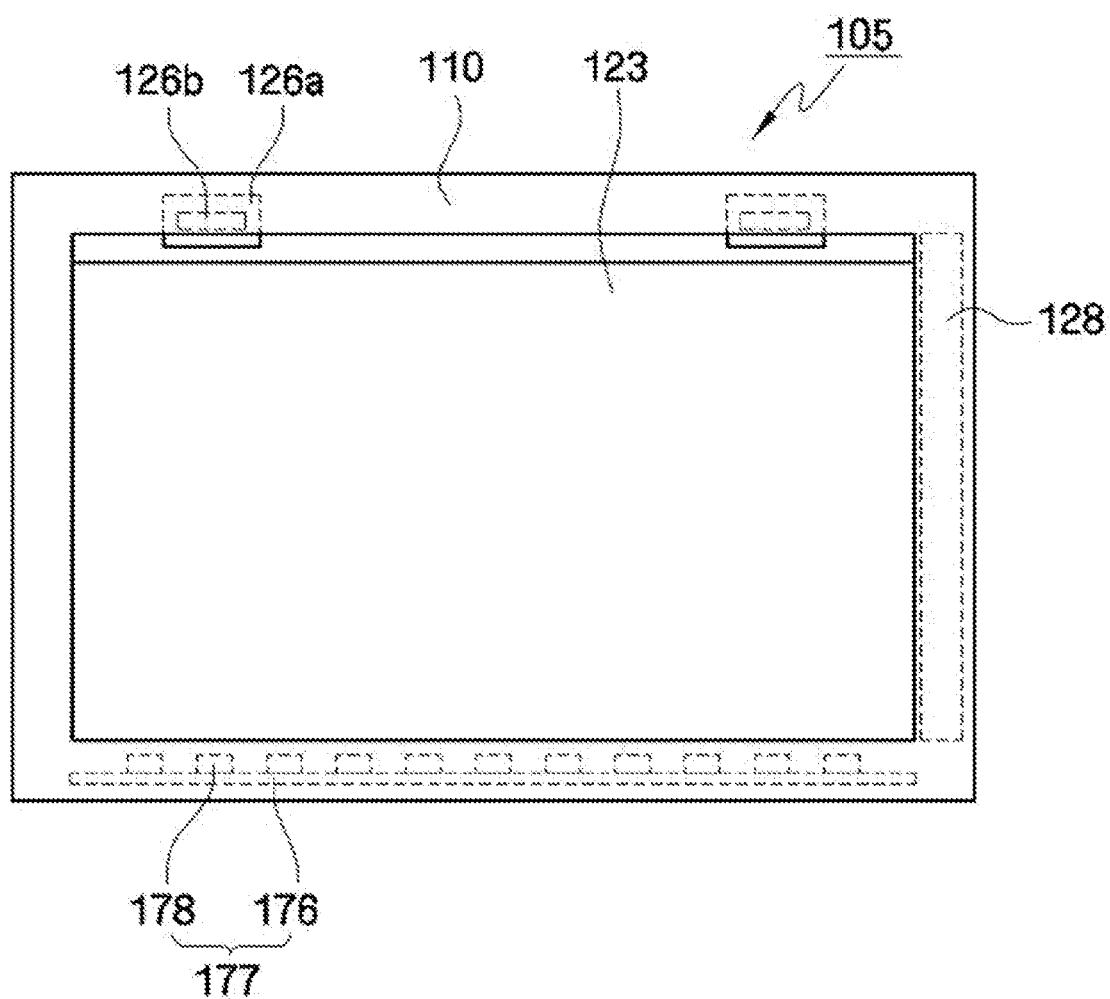
FIG. 13 is a front view of an LCD according to a sixth exemplary embodiment of the present invention.

Hereinafter, an LCD according to a sixth exemplary embodiment of the present invention will be described with reference to FIG. 13. FIG. 13 is a front view of an LCD 105 according to a sixth exemplary embodiment of the present invention. For the sake of simplicity, elements having the same functions as those illustrated in the drawings of the previous exemplary embodiments are indicated by like reference numerals, and thus their description will be largely omitted. The following description will focus mostly on differences from the previous exemplary embodiments.

Unlike in the LCD 10 according to the fifth exemplary embodiment, in the LCD 105 according to the sixth exemplary embodiment, a light source 177 is disposed along a lower long side of a liquid crystal panel 123, and a driver IC chip 126b and a circuit film 126a are disposed on an upper long side of the liquid crystal panel 123.

Figure 14:
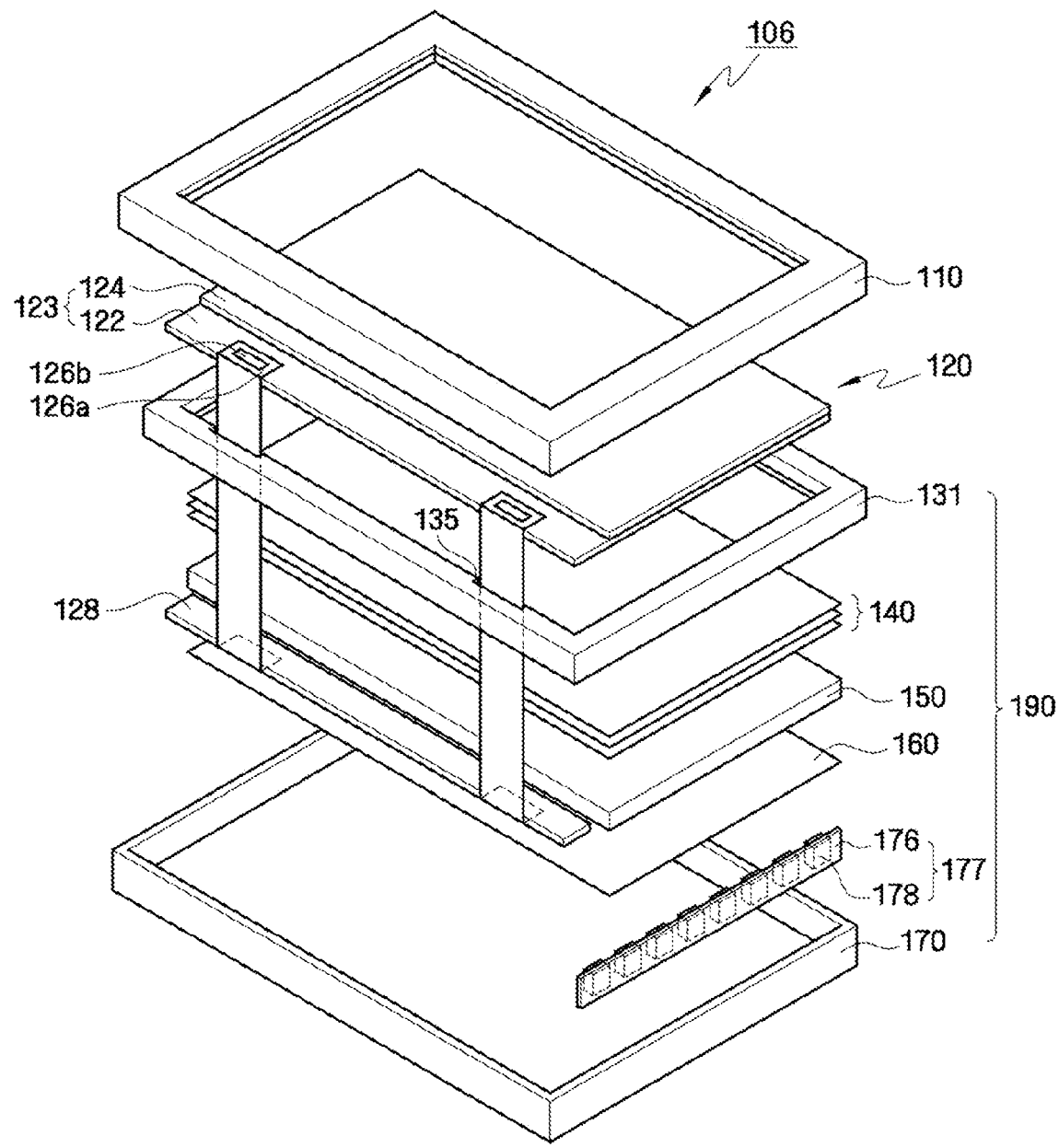
FIG. 14 is an exploded perspective view of an LCD according to a seventh exemplary embodiment of the present invention.
Figure 15:
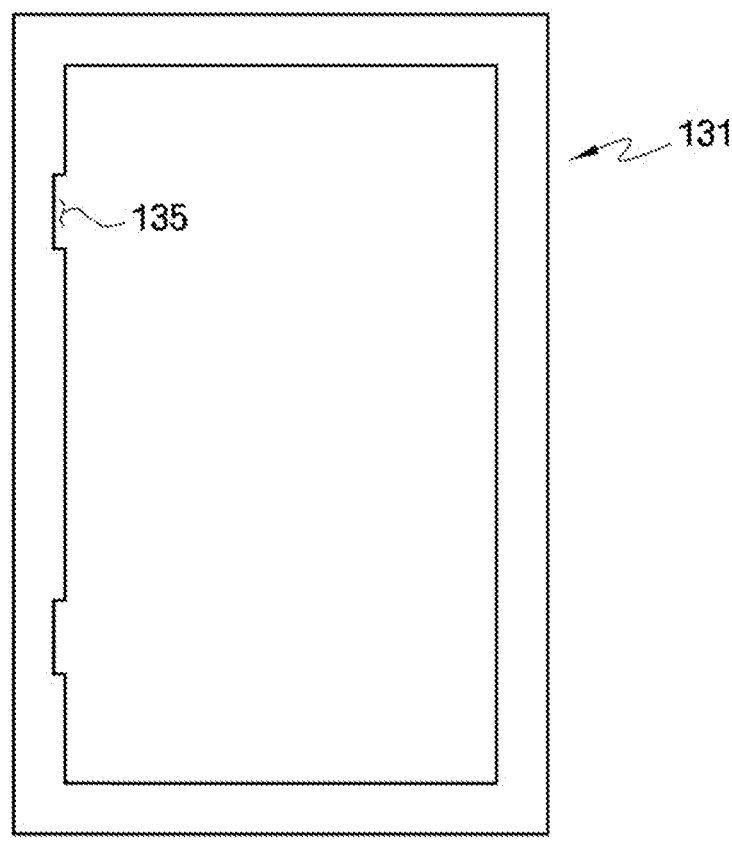
FIG. 15 is a plan view of a mold frame shown in FIG. 14.

Hereinafter, an LCD according to a seventh exemplary embodiment of the present invention will be described with reference to FIGS. 14 and 15. FIG. 14 is an exploded perspective view of an LCD 106 according to a seventh exemplary embodiment of the present invention. FIG. 15 is a plan view of a mold frame 131 shown in FIG. 14. For the sake of simplicity, elements having the same functions as those illustrated in the drawings of the previous exemplary embodiments are indicated by like reference numerals, and thus their description will be largely omitted. The following description will focus mostly on differences from the previous exemplary embodiments.

In the LCD 106 according to the seventh exemplary embodiment, grooves 135 are formed in an inner surface of a sidewall of the mold frame 131. Each of the grooves 135 is formed to correspond to an area in which a circuit film 126a is disposed. When the circuit film 126a extends to a first PCB 128 via the inner surface of the sidewall of the mold frame 131, each of the grooves 135 provides a space through which the circuit film 126a can pass without interference from the mold frame 131.

Figure 16:
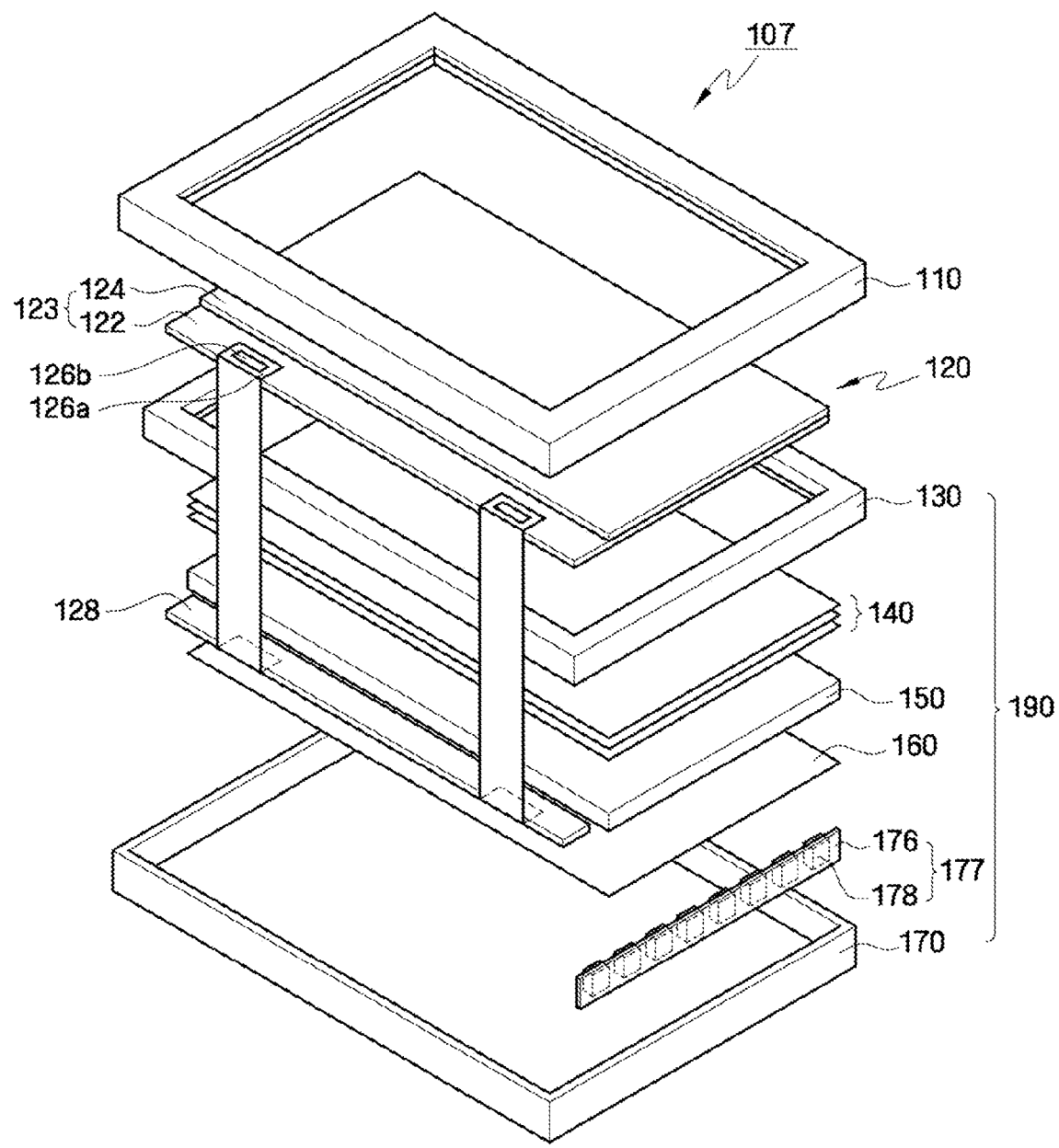
FIG. 16 is an exploded perspective view of an LCD according to an eighth exemplary embodiment of the present invention.

Hereinafter, an LCD according to an eighth exemplary embodiment of the present invention will be described with reference to FIG. 16. FIG. 16 is an exploded perspective view of an LCD 107 according to an eighth exemplary embodiment of the present invention. For the sake of simplicity, elements having the same functions as those illustrated in the drawings of the previous exemplary embodiments are indicated by like reference numerals, and thus their description will be largely omitted. The following description will focus mostly on differences from the previous exemplary embodiments.

In the LCD 107 according to the eighth exemplary embodiment, each circuit film 126a extends to a first PCB 128 via an outer surface of a sidewall of a mold frame 130, and is connected to the first PCB 128. Sidewalls of the mold frame 130 may be located inside sidewalls of a lower container 170.

Figure 17:
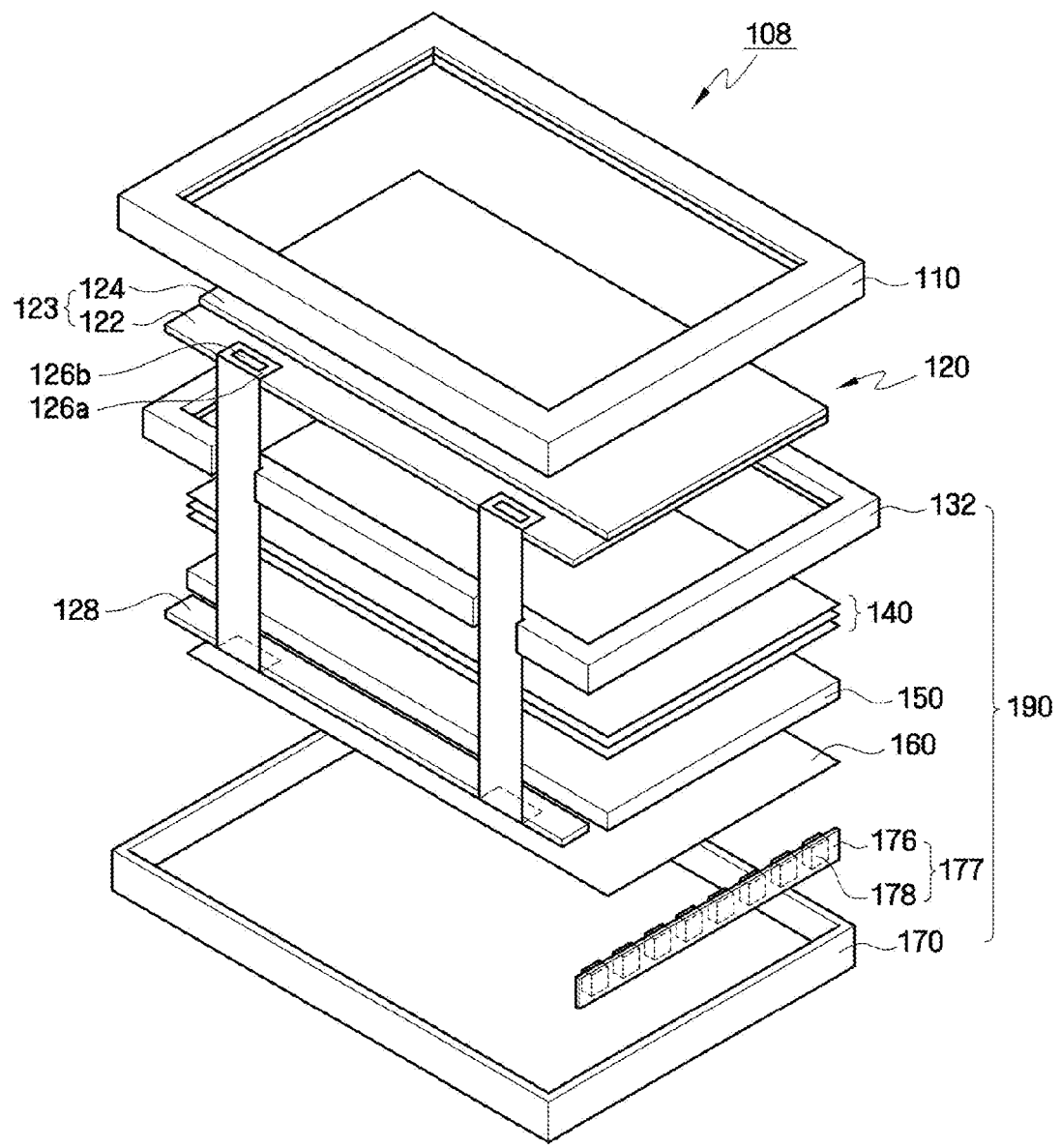
FIG. 17 is an exploded perspective view of an LCD according to a ninth exemplary embodiment of the present invention.
Figure 18:
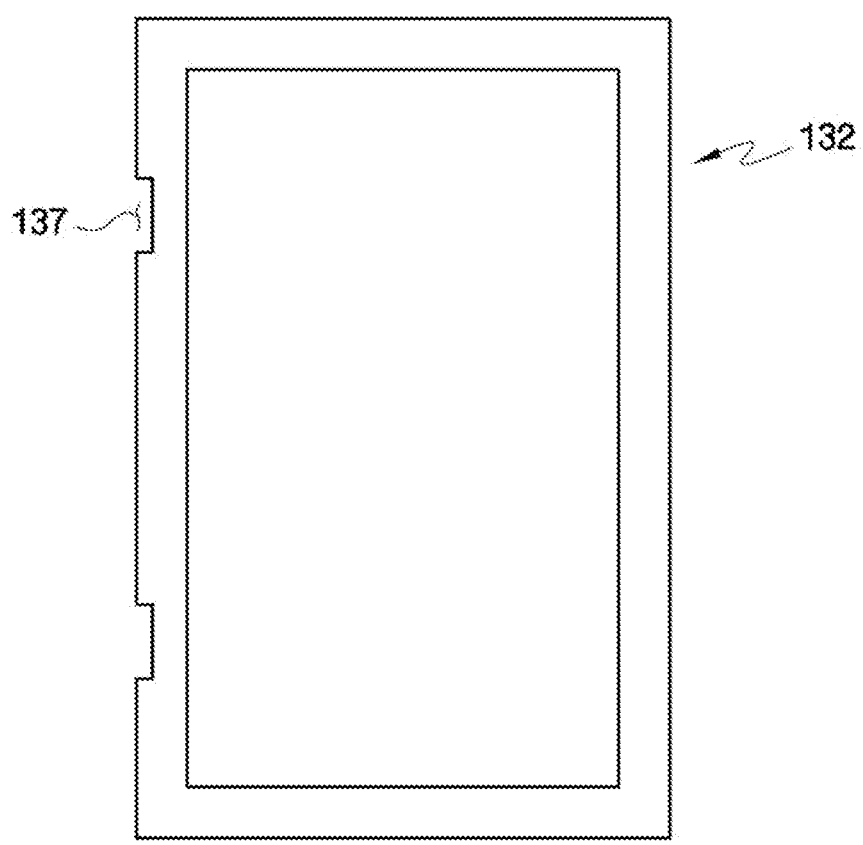
FIG. 18 is a plan view of a mold frame shown in FIG. 17.

Hereinafter, an LCD according to a ninth exemplary embodiment of the present invention will be described with reference to FIGS. 17 and 18. FIG. 17 is an exploded perspective view of an LCD 108 according to a ninth exemplary embodiment of the present invention. FIG. 18 is a plan view of a mold frame 132 shown in FIG. 17. For the sake of simplicity, elements having the same functions as those illustrated in the drawings of the previous exemplary embodiments are indicated by like reference numerals, and thus their description will be largely omitted. The following description will focus mostly on differences from the previous exemplary embodiments.

In the LCD 108 according to the ninth exemplary embodiment, grooves 137 are formed in an outer surface of a sidewall of the mold frame 132. Each of the grooves 137 is formed to correspond to an area in which a circuit film 126a is disposed. When the circuit film 126a extends to a first PCB 128 via the outer surface of the sidewall of the mold frame 132, each of the grooves 137 provides a space through which the circuit film 126a can pass without interference from the mold frame 132.

Figure 19:
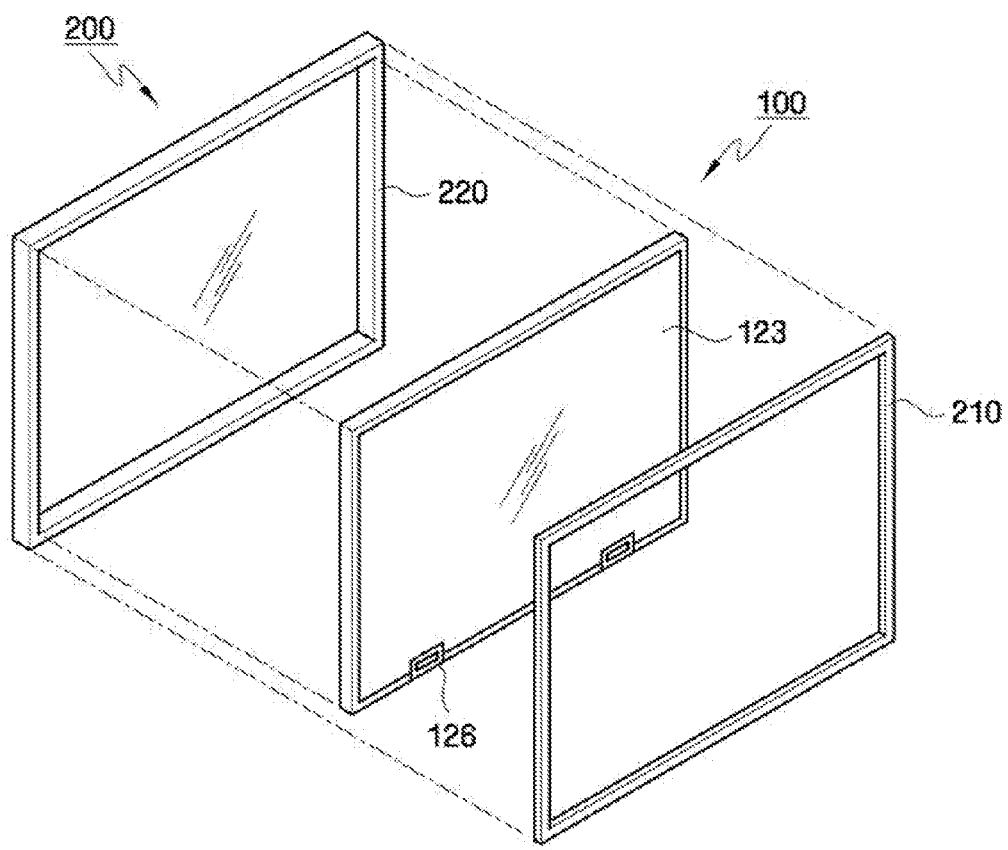
FIG. 19 is an exploded perspective view of a display apparatus set according to a tenth exemplary embodiment of the present invention.

Hereinafter, a display apparatus set according to a tenth exemplary embodiment of the present invention will be described with reference to FIG. 19. FIG. 19 is an exploded perspective view of a display apparatus set 200 according to a tenth exemplary embodiment of the present invention. For ease of description, a case where the LCD 100 of FIG. 1 is employed will be described as an example. However, the present invention is not limited to this case, and all LCDs described above can also be employed.

Referring to FIG. 19, the display apparatus 200 according to the tenth exemplary embodiment includes the LCD 100, a back case 220 which is installed behind the LCD 100, and a front case 210 which is installed in front of the LCD 100 and is coupled to the back case 220. The front case 210 has an open window which exposes an effective display area of the LCD 100.

Each of the back case 220 and the front case 210 may be generally shaped like a rectangle having short and long sides.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:
1. A liquid crystal display (LCD) comprising:
a liquid crystal panel having a short side and a long side that is longer than the short side;
a light guide plate (LGP) overlapping the liquid crystal panel, the LGP having a light emitting surface and a plurality of side surfaces that extends from edges of the light emitting surface, the plurality of side surfaces including a short side surface opposing the short side of the liquid crystal panel and a long side surface opposing the long side of the liquid crystal panel;
a container accommodating the LGP, wherein the container comprises a lower container and an upper container, the lower container including a plurality of sidewalls that extends from a bottom of the lower container and surrounds the plurality of side surfaces of the LGP, the plurality of side walls including a short side wall opposing the short side of the liquid crystal panel and a long side wall opposing the long side of the liquid crystal panel;
a printed circuit board (PCB) disposed between a long side surface of the plurality of side surfaces of the LGP and a long sidewall of the plurality of sidewalls of the container exclusively, the PCB being configured to provide an image signal to the liquid crystal panel, wherein the PCB is disposed on the same plane as the LGP;
a driver integrated circuit (IC) chip which is electrically connected to the PCB and includes a data driver and a timing controller embedded in the driver IC chip, the timing controller receiving RGB data for displaying images, a data enable signal, vertical and horizontal synchronization signals, and a clock signal from an external system; and
a light source disposed between a short side surface of the plurality of side surfaces of the LGP and a short sidewall of the plurality of sidewalls of the container exclusively, the light source being configured to provide light to the liquid crystal panel.

2. The LCD of claim 1, wherein the LGP is a substantially planar LGP occupying a plane, and wherein the PCB is positioned so as to occupy the plane.

3. The LCD of claim 1, wherein the PCB is disposed along a lower long side of the liquid crystal panel.

4. The LCD of claim 1, wherein the driver IC chip is disposed along the long side of the liquid crystal panel.

5. The LCD of claim 1, wherein the driver IC chip is disposed along the short side of the liquid crystal panel.

6. The LCD of claim 5, further comprising a circuit film which is disposed along the short side of the liquid crystal panel, has an end connected to the liquid crystal panel, and has another end connected to the PCB.

7. The LCD of claim 6, wherein the circuit film includes a bend proximate to the short side of the liquid crystal panel, a first portion extending generally parallel to the long sides of the liquid crystal panel, and a second portion extending generally toward the PCB, for connection to the PCB.

8. The LCD of claim 1, further comprising a circuit film which electrically connects the PCB to the driver IC chip.

9. The LCD of claim 8, wherein the driver IC chip is mounted on the liquid crystal panel.

10. The LCD of claim 8, wherein the driver IC chip is mounted on the circuit film.

11. The LCD of claim 8, further comprising a connector which is formed on a rear surface of the PCB and is connected to the circuit film.

12. The LCD of claim 1, wherein the PCB is a first PCB, and wherein the light source comprises point light source elements and a second PCB on which the point light source elements are mounted.

13. An LCD comprising:
a liquid crystal panel having a short side and a long side that is longer than the short side;
a light guide plate (LGP) overlapping the liquid crystal panel, the LGP having a light emitting surface and a plurality of side surfaces that extends from edges of the light emitting surface, the plurality of side surfaces including a short side surface opposing the short side of the liquid crystal panel and a long side surface opposing the long side of the liquid crystal panel;
a driver integrated circuit (IC) chip mounted on the liquid crystal panel and comprising a data driver and a timing controller embedded in the driver IC chip, the timing controller receiving RGB data for displaying images, a data enable signal, vertical and horizontal synchronization signals, and a clock signal from an external system;
a PCB disposed along the long side surface of the plurality of side surfaces of the LGP exclusively and electrically connected to the driver IC chip, wherein the PCB is disposed on the same plane as the LGP, the timing controller receiving RGB data for displaying images, a data enable signal, vertical and horizontal synchronization signals, and a clock signal from an external system; and
a light source disposed along the short side of the LGP exclusively and configured to provide light to the liquid crystal panel.

14. The LCD of claim 13, wherein the driver IC chip is disposed along the long side surface of the plurality of side surfaces of the LGP.

15. A display apparatus set comprising:
an LCD; and
a front case placed in front of the LCD and having an open window exposing a display area of the LCD,
wherein the LCD comprises:
a liquid crystal panel having a short side and a long side that is longer than the short side;
an LGP overlapping the liquid crystal panel, wherein the LGP is a substantially planar LGP occupying a plane and has a light emitting surface and a plurality of side surfaces that extends from edges of the light emitting surface, the plurality of side surfaces including a short side surface opposing the short side of the liquid crystal panel and a long side surface opposing the long side of the liquid crystal panel;
a container accommodating the LGP, wherein the container comprises a lower container and an upper container, the lower container including a plurality of sidewalls that extends from a bottom of the lower container and surrounds the plurality of side surfaces of the LGP, the plurality of side walls including a short side wall opposing the short side of the liquid crystal panel and a long side wall opposing the long side of the liquid crystal panel;
a printed circuit board (PCB) disposed between a long side surface of the plurality of side surfaces of the LGP and a long sidewall of the plurality of sidewalls of the container exclusively and configured to provide an image signal to the liquid crystal panel, wherein the PCB is disposed on the same plane as the LGP;
a driver integrated circuit (IC) chip which is electrically connected to the PCB and includes a timing controller embedded in the driver IC chip, the timing controller receiving RGB data for displaying images, a data enable signal, vertical and horizontal synchronization signals, and a clock signal from an external system; and
a light source disposed between the short side surface of the plurality of side surfaces of the LGP and the short sidewall of the plurality of side walls of the container exclusively and configured to provide light to the liquid crystal panel.

* * * * *